US012719561B2

(12) United States Patent
Szigeti et al.

(10) Patent No.: US 12,719,561 B2
(45) Date of Patent: Aug. 25, 2026

(54) APPLICATION-AWARE ROUTING THROUGH PATHS OF SATELLITE NETWORKS

(71) Applicant: Cisco Technology, Inc., San Jose, CA (US)

(72) Inventors: Thomas Szigeti, Vancouver (CA); David John Zacks, Vancouver (CA); Jeff Apcar, Willoughby (AU); Robert Edgar Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 770 days.

(21) Appl. No.: 18/116,493

(22) Filed: Mar. 2, 2023

(65) Prior Publication Data

US 2024/0297708 A1 Sep. 5, 2024

(51) Int. Cl.
*H04B 7/185* (2006.01)

(52) U.S. Cl.
CPC ................................ *H04B 7/18513* (2013.01)

(58) Field of Classification Search
None
See application file for complete search history.

(56) References Cited

U.S. PATENT DOCUMENTS

2018/0062737 A1 3/2018 Wyler
2022/0247678 A1 8/2022 Atwal et al.
2024/0250899 A1* 7/2024 Ravishankar .......... H04B 7/195
2024/0259910 A1* 8/2024 Dillon ............... H04W 28/0263

FOREIGN PATENT DOCUMENTS

CN 105791118 A 7/2016

OTHER PUBLICATIONS

Cao, et al., "Dynamic Routings in Satellite Networks: An Overview," pubmed.nobi.nim.nih, Jun. 16, 2022, 46 pages.
Kumar, et al. "fybrrLink: Efficient QoS-aware Routing in SDN enabled Next-Gen Satellite Networks," Dept. of Electrical Engineering and Computer Science Indian Institute of Technology Bhilal, India, Jun. 14, 2021, 12 pages.

* cited by examiner

*Primary Examiner* — Jay P Patel
*Assistant Examiner* — Shehab A Alawdi
(74) *Attorney, Agent, or Firm* — Lee & Hayes, P.C.

(57) ABSTRACT

Techniques for a low Earth orbit (LEO) satellite to route data through optimal satellite paths based on latency thresholds (and/or other QoS thresholds) for the application generating the data. The LEO satellite may identify the latency threshold from a data packet, where the latency threshold indicates an amount of time for the data packet to be relayed back down to a destination ground device. The LEO satellite determines available satellite paths through which data packets may be routed to destination ground stations. Further, the LEO satellite may determine latencies for transmitting traffic over the available satellite paths. The LEO satellite may compare the latency threshold for the data packet with the latencies of the available satellite paths, and select a satellite path that is optimal for transmitting the data packet. In this way, LEO satellites intelligently route data through satellite paths based on the type of traffic being transmitted.

19 Claims, 6 Drawing Sheets

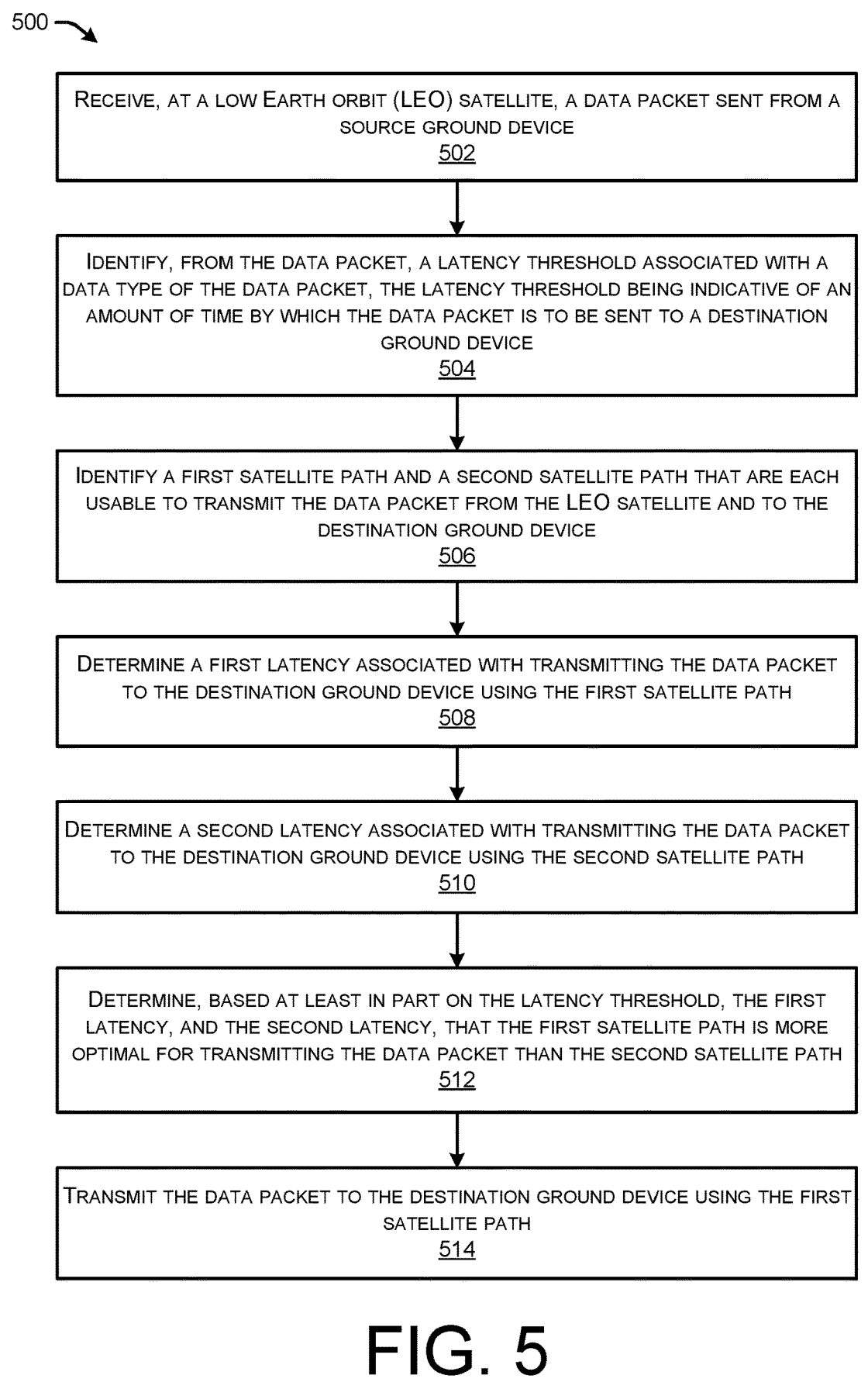

500

RECEIVE, AT A LOW EARTH ORBIT (LEO) SATELLITE, A DATA PACKET SENT FROM A SOURCE GROUND DEVICE
502

IDENTIFY, FROM THE DATA PACKET, A LATENCY THRESHOLD ASSOCIATED WITH A DATA TYPE OF THE DATA PACKET, THE LATENCY THRESHOLD BEING INDICATIVE OF AN AMOUNT OF TIME BY WHICH THE DATA PACKET IS TO BE SENT TO A DESTINATION GROUND DEVICE
504

IDENTIFY A FIRST SATELLITE PATH AND A SECOND SATELLITE PATH THAT ARE EACH USABLE TO TRANSMIT THE DATA PACKET FROM THE LEO SATELLITE AND TO THE DESTINATION GROUND DEVICE
506

DETERMINE A FIRST LATENCY ASSOCIATED WITH TRANSMITTING THE DATA PACKET TO THE DESTINATION GROUND DEVICE USING THE FIRST SATELLITE PATH
508

DETERMINE A SECOND LATENCY ASSOCIATED WITH TRANSMITTING THE DATA PACKET TO THE DESTINATION GROUND DEVICE USING THE SECOND SATELLITE PATH
510

DETERMINE, BASED AT LEAST IN PART ON THE LATENCY THRESHOLD, THE FIRST LATENCY, AND THE SECOND LATENCY, THAT THE FIRST SATELLITE PATH IS MORE OPTIMAL FOR TRANSMITTING THE DATA PACKET THAN THE SECOND SATELLITE PATH
512

TRANSMIT THE DATA PACKET TO THE DESTINATION GROUND DEVICE USING THE FIRST SATELLITE PATH
514

FIG. 5

APPLICATION-AWARE ROUTING THROUGH PATHS OF SATELLITE NETWORKS

TECHNICAL FIELD

The present disclosure relates generally to routing of data through satellite networks over optimal satellite paths.

BACKGROUND

Wide area networks, or "WANs," are telecommunication networks that connect and enable computing devices to communicate over large geographic areas. Computing devices use WANs, such as the Internet, to communicate with each other over large distances on a daily basis. Generally, WANs are used to connect local area networks (LANs) with each other using edge or border routers, which are devices that route packets over lines that span between LAN locations. A classic example of a use case for a WAN is to connect an enterprise LAN network over a large geographic area to services hosted in a datacenter.

More recently, Software-defined WANs (SD-WANs) have been introduced to help make WAN architectures easier to deploy, operate, and manage. SD-WAN technologies utilize virtualization, application-level policies and overlay networks, and software platforms to increase data-transfer efficiencies across WANs by moving traffic to lower-cost network links to do the work of more-expensive leased lines. Various WAN and SD-WAN technologies are used to communicate data packets between devices and across WANs. For instance, these technologies include packet switching methods, Transport Control Protocol (TCP), Internet Protocol (IP), overlay networks, Multiprotocol Label Switching (MPLS) techniques, and so forth. Using these technologies, a first router can connect a first LAN over a WAN with a second router located within a second LAN.

While WAN networks are effective in delivering network connectivity to most users, there are many users in remote locations, unsupported countries or regions, and/or other areas that do not have reasonable access to WAN networks. Accordingly, various enterprises and organizations have developed and deployed satellite WAN networks that are composed of hundreds or thousands of satellites that orbit earth. Satellite networks are able to provide WAN connectivity to these remote or unsupported users because all that is required is a satellite dish, a router, and a clear line of sight to one or more of the orbiting satellites. The router uses the satellite dish to transmit satellite signals, or "beams," to an orbiting satellite, which then relays the signal to another satellite in the network and/or another router associated with a destination of the signal. Some of the original satellite communication networks are geosynchronous in operation in that the satellites rotated around the Earth at roughly the same speed as the Earth rotates. However, the original satellite networks were located at a fairly high altitude above the Earth (e.g., 40,000 kilometers (km)), and this resulted in limited bandwidth and poor performance as the round-trip-time was long and limited by the speed of light.

More recently there has been an emergence of Low Earth Orbit (LEO) satellite constellations which are satellite networks that consist of thousands of small satellites in low Earth orbit (e.g., 500 km in altitude). Some of these LEO satellite networks are not geosynchronous, but are constantly moving relative to the Earth, and thus constantly moving relative to routers and satellite dishes on Earth. The satellites in these LEO satellite networks are arranged in a grid (or constellation) that move in unison according to predefined patterns or orbital paths.

These LEO satellite networks do provide improved bandwidth and reduced latency, but they also have smaller spot coverage due to the low altitude of orbit as well as the movement of the satellites relative to locations on Earth. With the smaller spot coverage, LEO satellites can experience difficulties finding ground stations within their coverage to which they can relay communications back down.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 illustrates a flow diagram of an example method for a LEO satellite to route data through optimal satellite paths based on quality of service (QoS) thresholds, such as latency thresholds, associated with the data.

DESCRIPTION OF EXAMPLE EMBODIMENTS

Overview

Figure 1:
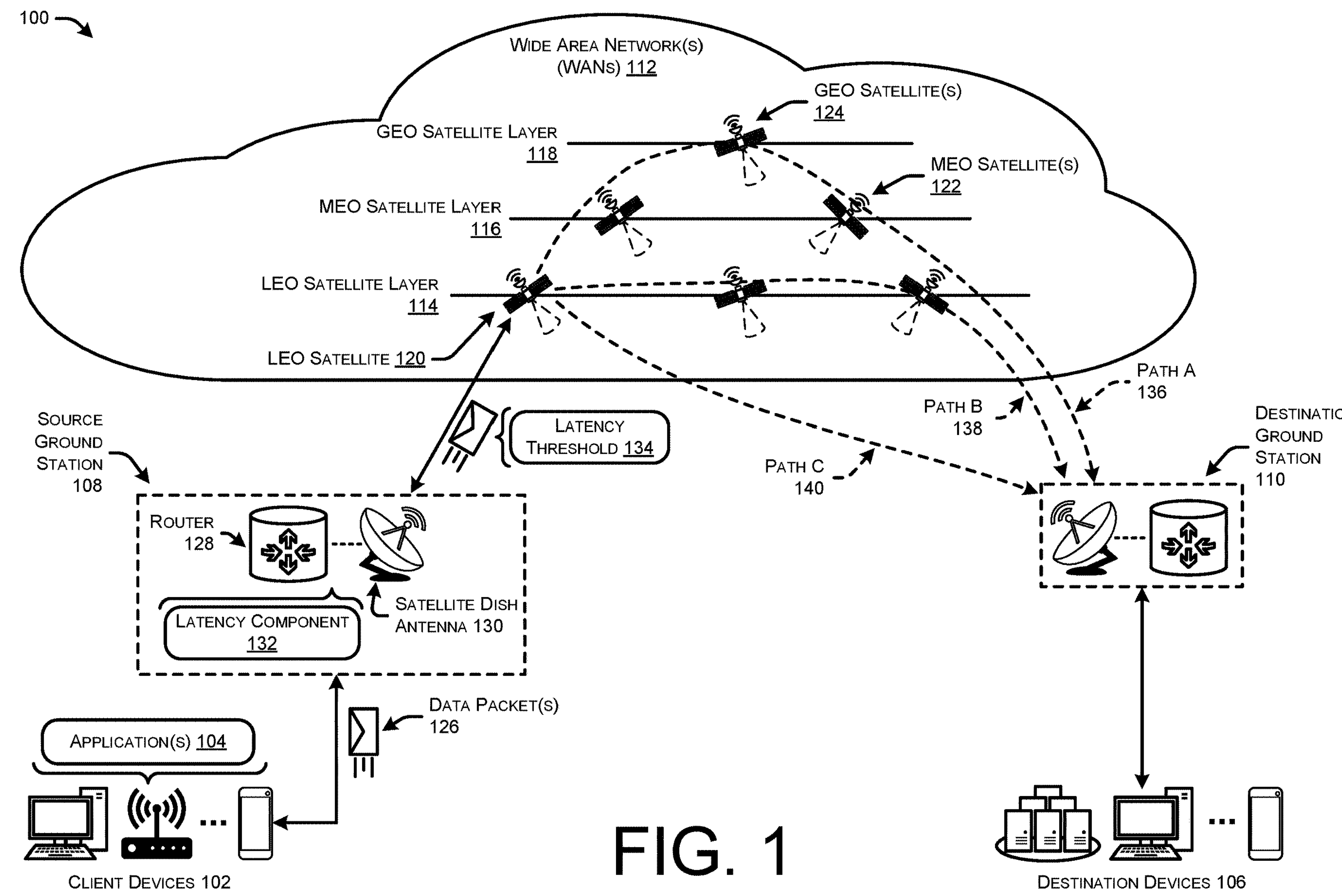
FIG. 1 illustrates a system-architecture diagram of an example WAN that includes a LEO satellite that routes data through optimal satellite paths based on quality of service (QoS) thresholds, such as latency thresholds, associated with the data being transmitted.

This disclosure describes techniques for a LEO satellite to route data through optimal satellite paths based on quality of service (QoS) thresholds, such as latency thresholds, associated with the application generating the data. A method to perform techniques described herein includes receiving, at the LEO satellite, a data packet sent from a source ground device, and identifying, from the data packet, a latency threshold associated with an application that generated the data packet. The latency threshold may be indicative of an amount of time by which the data packet is to be sent to a destination ground device. The method further includes identifying a first satellite path and a second satellite path that are each usable to transmit the data packet from the LEO satellite and to the destination ground device. Further, the method includes determining a first latency associated with transmitting the data packet to the destination ground device using the first satellite path, and determining a second latency associated with transmitting the data packet to the destination ground device using the second satellite path. Additionally, the method includes determining, based at least in part on the latency threshold, the first latency, and the second latency, that the first satellite path is more optimal for transmitting the data packet than the second satellite path. The method may further include transmitting the data packet to the destination ground device using the first satellite path.

Additionally, the techniques described herein may be performed by a system and/or device having non-transitory computer-readable media storing computer-executable instructions that, when executed by one or more processors, performs the method described above.

Example Embodiments

This disclosure describes techniques for a LEO satellite to route data through optimal satellite paths based on latency thresholds (and/or other QoS thresholds) associated with the type of data and/or an application generating the data. The LEO satellite may identify the latency threshold from a data packet, such as a header of the data packet, where the latency threshold generally indicates an amount of time for the data packet to be relayed back down to a destination ground device. The LEO satellite may constantly, or periodically, determine sets of available satellite paths through which data packets may be routed to destination ground stations. Further, the LEO satellite may determine latencies for transmitting traffic over the available satellite paths, such as by probing the different satellite paths. The LEO satellite may then compare the latency threshold for the data packet with the latencies determined for the available satellite paths and select a satellite path that is optimal to use for transmitting the data packet. For instance, latency insensitive data may be sent over paths that have a higher latency, whereas paths with low latencies may be selected for transmitting latency-sensitive data. In this way, LEO satellites are able to intelligently route data through satellite paths by evaluating the type of traffic (e.g., application sending the traffic) that is to be transmitted.

LEO satellites typically orbit the Earth at lower altitudes in the range of 300-2.000 kilometers (km), and this low altitude means that LEO satellites have smaller spot coverages on the Earth at any given time. Considering this smaller spot coverage, and because LEO satellites are consistently moving relative to the surface of the Earth, the ground stations to which data is relayed back down constantly move in-and-out of view of the LEO satellites. While there are various ways to solve this, each solution has different draw backs.

For instance, many ground stations may be built, but this is highly inefficient as a plethora of ground stations are required to be built so the satellite always has an available station to relay data back down to the Earth. Alternatively, the LEO satellites may be equipped with inter-LEO satellite communication systems, such as lasers, that allow data transmissions to be transmitted across a network of other LEO satellites in same constellation until a satellite is reached that is within range of a ground station. However, this does not work well for networks that have smaller constellations, and greatly increases the cost and complexity of these networks. As another option, LEO satellites may communicate with middle Earth orbit (MEO) satellites (e.g., satellites that orbit at altitudes around 2,000-36,000 km), or geosynchronous Earth orbit (GEO) satellites (e.g., satellites that orbit at altitudes around 36,000 km). However, transmitting data to MEO or GEO satellites may incur extra cost to the end user and/or LEO satellite network operator. As a final option, the LEO satellite may simply cache the data until a ground station comes within view, which could be up to 120 minutes of delay depending on the satellite network. While this solution may work well for latency-insensitive data, this type of delay is unacceptable for latency-sensitive data, such as real-time traffic.

This disclosure describes techniques for a LEO satellite to intelligently determine how to best route data to a destination ground station based on a type of the data, an application that is sending the data, and/or on various QoS values (e.g., latency thresholds). For satellite networks, there are ground stations located at different geolocations that transmit data from devices on Earth (e.g., user devices) and to the LEO satellites. These source ground stations may use antennas and transmission equipment to communicate with the LEO satellites on behalf of the user devices and other endpoints. In some instances, the source ground station (e.g., ground station that transmitted the data to the LEO satellite from Earth) may perform various techniques for determining QoS values for the data that will be used by the LEO satellite to route the data. However, in some instances the LEO satellite may be configured to analyze the data as well.

Consider an example where latency is used as a QoS metric for routing the data. The source ground station may determine a type of the data (e.g., video data, sensor data, etc.), and/or an application that generated the data (e.g., a web-conferencing application, sensor application, etc.) and determine a latency threshold for the data. In a simplistic example, the latency threshold may be on a scale from 1-10 where a latency threshold of "1" would be used for an application with almost no latency requirements (e.g., data collection application), and a latency threshold of "10" would be used for an application with very strict (low) latency requirements (e.g., video-conferencing application). As another example, the source ground station may determine actual latency values for the data, such as an acceptable latency defined by a number of milliseconds, seconds, minutes, etc.

The source ground station may then insert the latency threshold for the type of data into a packet of the traffic stream. In some examples, the latency threshold may be written into the packet header, such as a reserved or experimental Differentiated Services Code Point (DSCP) in an Internet Protocol (IP) header, in an IP version 6 (IPv6) extension header, and/or any other form of metadata associated with the packet header. The source ground station may encode the latency threshold into the packet header, particularly for instances where the body of the packets are encrypted.

The source ground station may then transmit the packets in the data stream to a LEO satellite in a satellite network, and the LEO satellite may then transmit the packets towards a destination of the data steam. The LEO satellite may be configured to behave as a router for the satellite networks and route data packets through different network paths. The LEO satellite may continuously, or periodically, determine its location relative to Earth, or at least relative to available ground stations as the LEO satellite orbits Earth. The LEO satellite then determines all of the transmission options, or network paths, that are available to reach the different ground stations based on its location. The different types of network paths that may be available can include network paths through a LEO satellite network layer, through MEO and/or GEO satellite layers, or may simply be a direct path to a ground station that is in range of the LEO satellite. The LEO satellites may additionally determine latencies for each of the available paths, such as by using probe link options. Because the available network paths are constantly changing as the LEO satellite orbits Earth, and the network characteristics of those paths also change, the LEO satellite may send probe packets on a regular basis to detect changes in latencies of the paths. The probe packets may indicate round-trip times and/or one-way trip times that are used to identify latencies for the available network paths.

After determining latencies for the available network paths, the LEO satellite may determine which of the available network paths is optimal for the particular data stream. The LEO satellite may be programmed with logic that does not necessarily choose the lowest latency network path, but instead selects a network path that is appropriately tailored for the latency threshold of the data. As an example, if network path A has a latency value of "5," and network path B has a latency value of "7" (where 7 indicates a faster, or lower latency, path than the 5) and the latency threshold for the data packets is an "4," the LEO satellite may select network path A for the data packets despite network path B being a faster option. Thus, the LEO satellite may determine which of the network paths can satisfy the latency threshold of the data packets, and then select the network path that is appropriately tailored or suited for the latency threshold of the data. In this way, higher-latency (slower) network paths may be used for transmitting latency-insensitive data (e.g., sensor data for storage), and the lower-latency (faster) network paths may be used for transmitting latency-sensitive data (e.g., video-conferencing streams).

When selecting a network path, the LEO satellite may consider additional factors, such as cost-constraint variables that represent various costs for transmitting data along the different paths. As an example, transmitting data through MEO/GEO satellite networks can be more expensive than using LEO satellite networks, and that cost may be passed onto the user or the LEO satellite network operator. Accordingly, network paths through MEO/GEO satellite networks may have associated cost-constraints variables attached that may cause the LEO satellite to favor other network path options. As another example, the LEO satellite may consider transmission costs through the different network paths. For instance, next hops that are further away may require more power to transmit data to, and that may strain the batteries on the LEO satellites. Accordingly, the LEO satellite may weight those options down based on the cost of transmission on battery life.

In some instances, the LEO satellite may determine that a destination ground station will be in transmission range in a short period of time (e.g., a few seconds, a few minutes, etc.). The LEO satellite may determine that the latency threshold for the data is such that the data is latency-insensitive, and the period of time until the destination ground station is in range is permitted by the latency threshold. In such examples, the LEO satellite may simply determine to cache the data and wait until the destination ground station is in range, and then transmit the data down to the destination ground station. This technique can help conserve network bandwidth and resources, while still satisfying any latency thresholds for the data stream.

Accordingly, the techniques described herein improve the performance of satellite networks that transmit data by turning LEO satellites into routers that intelligently route data through optimal network paths that satisfy QoS metrics associated with the data. Although many of the techniques are described herein with respect to latency thresholds or values associated with transmitting data, other QoS characteristics may additionally, or alternatively, be used, such as, packet loss, available bandwidth, jitter, and/or other characteristics indicative of network performance. Further, while some of the techniques are described as being performed by a ground station and/or a LEO satellite device, some of the operations may be performed by other devices and/or at other locations. For instance, the application, client device, ground station, and/or LEO satellite may each be configured to determine latency threshold based on the data type and/or application.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram 100 of an example WAN that includes a LEO satellite that routes data through optimal satellite paths based on QoS thresholds, such as latency thresholds, associated with the data being transmitted.

The system-architecture diagram 100 illustrates one or more client devices 102 that are running one or more application(s) 104 and are configured to communicate over one or more WANs 112 to one or more destination devices 106. The client devices 102 may communicate with a source ground station 108 that transmits over the WAN(s) 112 to a destination ground station 110 that relays the data to the destination devices 106. The client devices 102 and destination devices 106 may comprise any type of device configured to communicate using various communication protocols (e.g., short range protocols, TCP/IP, User Datagram Protocol (UDP), tunneling protocols, and/or any other protocol) over various networks. For instance, the client devices 102 and/or destination devices may comprise one or more of personal user devices (e.g., desktop computers, laptop computers, phones, tablets, wearable devices, entertainment devices such as televisions, etc.), network devices (e.g., servers, routers, switches, access points, etc.), sensors, Internet-of-Thing (IoT) devices, data centers, application infrastructures, and/or any other type of computing device.

The WAN 112 may include one or more networks implemented by any viable communication technology, such as wired and/or wireless modalities and/or technologies. The WAN 112 may each include or connect any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The WAN 112 may include devices, virtual resources, or other nodes that relay packets from one network segment to another by nodes in the computer network.

As illustrated, the WAN 112 may include a LEO satellite layer (or "network") 114 that includes a plurality of LEO satellites 120 (e.g., hundreds or thousands of satellites), a MEO satellite layer (or "network") 116 that includes MEO satellites 122, and a GEO satellite layer (or "network") 118 that includes GEO satellites 124. The small satellites in the LEO satellite layer 114 may consist of thousands of small satellites in low Earth orbit (e.g., 500 km in altitude). The LEO satellite network 114 may be constantly moving relative to the Earth, and thus constantly moving relative to ground stations 108/110 on Earth. The LEO satellites 120 in the LEO satellite network 114 may be arranged in a grid (or constellation) and move in unison according to predefined patterns or orbital paths. The LEO satellite network 114 may provide improved bandwidth, reduced latency, and smaller spot coverage due to the closer satellite location as well as the movement of the LEO satellites 120 relative to locations on Earth. Because the speed of light propagates faster in a vacuum, such as outer space, the LEO satellites 120 in the LEO satellite network 114 may handoff signals between the LEO satellites 120 until the signals reach a LEO satellite 120 closer to the destination device on Earth for transmission back to Earth. In some examples, the LEO satellites 120 may be in a grid that moves according to orbital paths, and in such examples, the distances between the LEO satellites 120 are constantly becoming shorter or longer as the LEO satellites 120 move along their respective paths.

Generally, the MEO satellites 122 are satellites that orbit at altitudes around 2,000-36,000 km), and the GEO satellites 124 (e.g., satellites that orbit at altitudes around 36,000 km). The LSO satellites 120 may communicate with the MEO and/or GEO satellites 122/124 to route the data to the destination ground station 110.

To communicate over satellite networks, the client devices 102 generally need to send the data they would like communicated to a ground station 108/110 that includes a router 128 that utilizes a satellite dish 130 to transmit signals to a satellite 120 in the LEO satellite network 114. In some examples, a provider or controller or the LEO satellite network 114 may provide users, often customers, with the required routers 128 and/or satellite dishes 130 to enable users to communicate over the LEO satellite network 114 using their client devices 102. The client devices 102 are configured to communicate over WANs using the TCP/IP suite of communication protocols.

As an example, an application 104 may generate a data stream comprising one or more data packets 126 to be communicated over the WAN(s) 112. The application 104 may be any type of application that can generate data, and the data packets 126 may include any type of data (e.g., sensor data, video data, audio data, text/image data, etc.). The data packets 126 may be sent to a source ground station 108, and the source ground station 108 may use antennas and transmission equipment (e.g., router 128, antenna 130), to communicate with the LEO satellites 120 on behalf of the client device 102. In some instances, the source ground station 108 (e.g., ground station that transmitted the data to the LEO satellite from Earth) may include one or more components to perform various techniques for determining QoS values for the data that will be used by the LEO satellite 120 to route the data packet 126. However, in some instances the LEO satellite 120 may be configured to analyze the data packet 126 as well.

Consider an example where latency is used as a QoS metric for routing the data. The source ground station 108 may include a latency component 132 that determines a type of the data (e.g., video data, sensor data, etc.), and/or the application 104 that generated the data (e.g., a web-conferencing application, sensor application, etc.) and determine a latency threshold for the data. In a simplistic example, the latency threshold may be on a scale from 1-10 where a latency threshold of “1” would be used for an application 104 with almost no latency requirements (e.g., data collection application 104), and a latency threshold of “10” would be used for an application 104 with very strict (low) latency requirements (e.g., video-conferencing application). As another example, the latency component 132 may determine actual latency values for the data, such as an acceptable latency defined by a number of milliseconds, seconds, minutes, etc.

The latency component 132 may then insert the latency threshold 134 for the type of data into the data packet 126 of the traffic stream. In some examples, the latency threshold 134 may be written into a header of the data packet 126, such as a reserved or experimental DSCP in an IP header of the data packet 126, in an IPV6 extension header, and/or any other form of metadata associated with the header of the data packet 126. The latency component 132 may encode the latency threshold 134 into the data packet 126, particularly for instances where the body of the data packet(s) 126 are encrypted.

The source ground station 108 may then transmit the data packets 126 in the data stream to the LEO satellite 120, and the LEO satellite 120 may then transmit the data packets 126 towards a destination device 106 of the data steam. The LEO satellite 120 may be configured to behave as a router for the WANs 112 and route the data packets 126 through different network paths. The LEO satellite 120 may continuously, or periodically, determine its location relative to Earth, or at least relative to available ground stations 108/110 as the LEO satellite 120 orbits Earth. The LEO satellite 120 then determines all of the transmission options, or network paths, that are available to reach the different ground stations based on its location.

In this illustrative example, network path A 136 includes a path through the LEO satellite layer 114, the MEO satellite layer 116, and the GEO satellite layer 118 to reach the destination ground station 110. Network path B 138 includes a path through only LEO satellites 120 of the LEO satellite layer 114. Further, network path C 140 is a direct path from the LEO satellite 120 and to the destination ground station 110 (which may potentially have a delay until the LEO satellite 120 to get into direct transmission range of the destination ground station 110.

The LEO satellite 120 may further determine latencies for each of the available paths 136, 138, and 140, such as by using probe link options. Because the available network paths are constantly changing as the LEO satellite 120 orbits Earth, and the network characteristics of those paths also change, the LEO satellite 120 may send probe packets on a regular basis to detect changes in latencies of the paths. The probe packets may indicate round-trip times that are used to identify latencies for the available network paths 136, 138, and 140.

After determining latencies for the available network paths 136, 138, and 140, the LEO satellite 120 may determine which of the available network paths 136, 138, and 140 is optimal for the particular data stream. The LEO satellite 120 may be programmed with logic that does not necessarily choose the lowest latency network path, but instead selects a network path that is appropriately tailored for the latency threshold of the data. As an example, if network path A has a latency value of “5,” and network path B has a latency value of “7” (where 7 indicates a faster, or lower latency, path than the 5) and the latency threshold for the data packets is an “4,” the LEO satellite may select network path A for the data packets despite network path B being a faster option. Thus, the LEO satellite may determine which of the network paths can satisfy the latency threshold of the data packets, and then select the network path that is appropriately tailored or suited for the latency threshold of the data. In this way, higher-latency (slower) network paths may be used for transmitting latency-insensitive data (e.g., sensor data for storage), and the lower-latency (faster) network paths may be used for transmitting latency-sensitive data (e.g., video-conferencing streams).

When selecting a network path 136, 138, and 140, the LEO satellite 120 may consider additional factors, such as cost-constraint variables that represent various costs for transmitting data along the different paths 136, 138, and 140. As an example, transmitting data through MEO/GEO satellite networks path A 136 can be more expensive than using LEO satellite network path 138, and that cost may be passed onto the user of the client device 102 or the LEO satellite network operator. Accordingly, the network paths 136, 138, and 140 through MEO/GEO satellite networks may have associated cost-constraints variables attached that may cause the LEO satellite 120 to favor other network path options. As another example, the LEO satellite 120 may consider transmission costs through the different network paths 136, 138, and 140. For instance, next hops that are further away may require more power to transmit data to, and that may strain the batteries on the LEO satellite 120. Accordingly, the LEO satellite 120 may weight those options down based on the cost of transmission on battery life.

In some instances, the LEO satellite 120 may determine that the destination ground station 110 will be in transmission range in a short period of time (e.g., a few seconds, a few minutes, etc.). The LEO satellite 120 may determine that the latency threshold 134 for the data packet 126 is such that the data is latency-insensitive, and the period of time until the destination ground station 110 is in range is permitted by the latency threshold 134. In such examples, the LEO satellite 120 may simply determine to cache the data and wait until the destination ground station 110 is in range, and then transmit the data down to the destination ground station 110. This technique can help conserve network bandwidth and resources, while still satisfying any latency thresholds 134 for the data stream.

Accordingly, the techniques described herein improve the performance of satellite networks that transmit data by turning LEO satellites 120 into routers that intelligently route data through optimal network paths that satisfy QoS metrics associated with the data. Although many of the techniques are described herein with respect to latency thresholds 134 or values associated with transmitting data packets 126, other QoS characteristics may additionally, or alternatively, be used, such as, packet loss, available bandwidth, jitter, and/or other characteristics indicative of network performance. Further, while some of the techniques are described as being performed by a ground station 108 and/or a LEO satellite device 120, some of the operations may be performed by other devices and/or at other locations. For instance, the application 104, client device 102, ground station 108, and/or LEO satellite 120 may each be configured to determine latency threshold based on the data type and/or application 104. The techniques of FIG. 1 are described with reference to client devices 102 communicating with destination devices 106, which may be an application architecture associated with the application 104.

Figure 2:
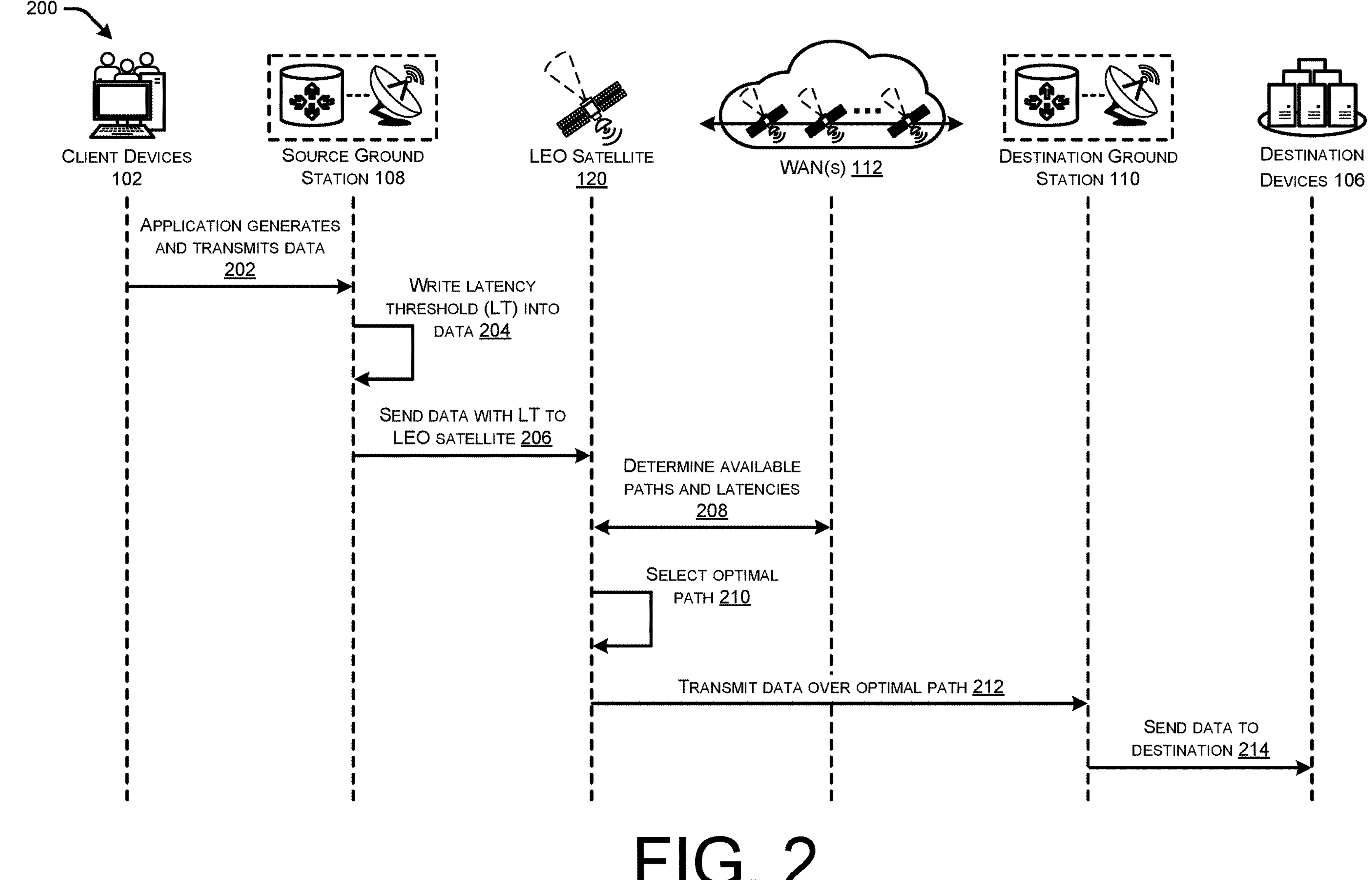
FIG. 2 illustrates an example sequence diagram in which a LEO satellite routes data through an optimal satellite path based at least in part on a latency threshold for the data being transmitted.

FIG. 2 illustrates an example sequence diagram 200 in which a LEO satellite 120 routes data through an optimal satellite path based at least in part on a latency threshold 134 for the data being transmitted.

At 202, the application 104 running on a client device 102 may generate data and transmit the data in a data packet 126 (e.g., traffic stream) to a source ground station 108. The source ground station 108 may classify the data, such as by determining a data type of the data, determining the application 104 that generated the data, etc.

At 204, the source ground station 108 may write a latency threshold 134 into the data packet 126. For instance, the latency component 132 may determine how latency sensitive or insensitive the data is based on the application 104 and/or type of data. The latency component 132 may be preconfigured to map particular types of data, or applications, to different latency threshold 134. For instance, video conferencing data/applications, Voice over Internet Protocol (VoIP) data/applications, emergency system data, etc., may be more latency sensitive (e.g., values from 7-10 out of 10), whereas sensor data (e.g., soil measurements, weather measurements, etc.) may be less latency sensitive (e.g., values from 1-3 out of 10). The latency component 132 may then insert the latency threshold 134 for the type of data into the data packet 126 of the traffic stream. In some examples, the latency threshold 134 may be written into a header of the data packet 126, such as a reserved or experimental DSCP in an IP header of the data packet 126, in an IPV6 extension header, and/or any other form of metadata associated with the header of the data packet 126. The latency component 132 may encode the latency threshold 134 into the data packet 126, particularly for instances where the body of the data packet(s) 126 are encrypted.

At 206, the source ground station 108 may transmit the data packet 126 with the latency threshold 134 to the LEO satellite 120 using at least the satellite dish antenna 130. At 208, the LEO satellite 120 may determine available paths to reach the destination ground station 110, and determine latencies for those paths. For instance, the LEO satellite 120 may constantly, or periodically determine its location relative to Earth and/or the ground stations with which it communicates. Further, the LEO satellite 120 may use various communication protocols, such as discovery protocols, to determine other LEO satellites 120, MEO satellites 122, and/or GEO satellites 124 are within range of the LEO satellite 120. The LEO satellite 120 may then determine paths through the various satellites that may be used to reach a destination ground station 110 for the destination device 106.

The LEO satellite 120 may then determine latencies for each network path. For instance, the LEO satellite 120 may use or send probe packets to determine round-trip-time, or at least one-way time, for transmitting traffic over the available network paths. The probe packets may be used on the network links to determine latency for these paths periodically or constantly.

At 210, the LEO satellite 120 may select the optimal network/satellite path for the data packets 126 based at least in part on the path latencies and the latency threshold 134. The LEO satellite 120 may identify the network paths that satisfy the latency threshold 134 (e.g., are at least fast enough to transmit the data within the latency threshold). Next, the LEO satellite 120 may determine which of the networks paths has a latency that is closest to the latency threshold (e.g., most suitable or appropriately tailored), and select that optimal path.

At 212, the LEO satellite 120 may then transmit the data packets 126 over the optimal path to the destination ground station 110. The destination ground station 110 may then send the data to a destination device 106 to which the data packets 126 are destined.

Figure 3:
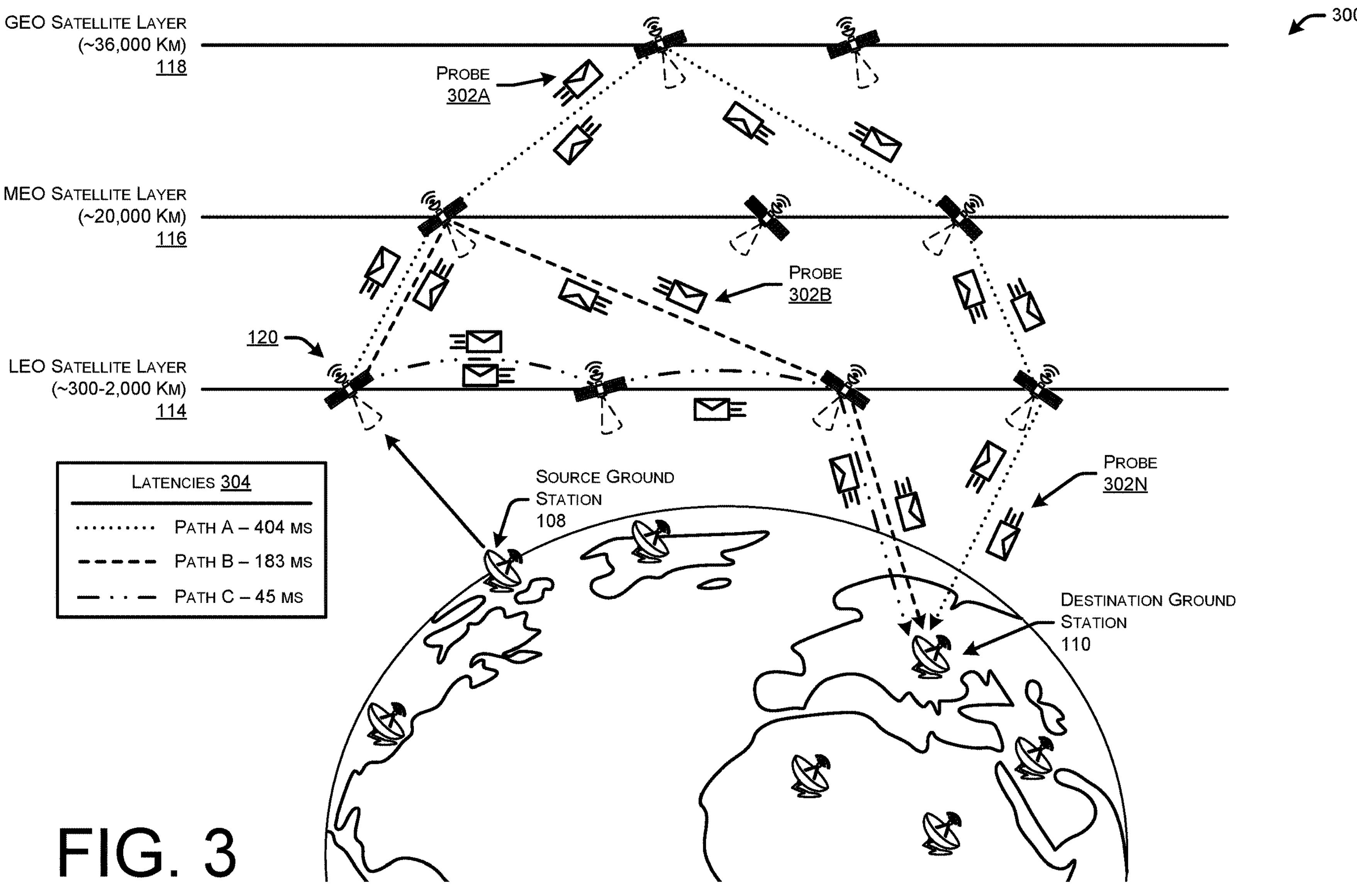
FIG. 3 illustrates a system-architecture diagram of an example WAN architecture in which a LEO satellite determines available satellite paths to a destination ground station, and uses probes to determine latencies for communicating data traffic using the available paths.

FIG. 3 illustrates a system-architecture diagram 300 of an example WAN architecture in which a LEO satellite 120 determines available satellite paths to a destination ground station 110, and uses probes to determine latencies for communicating data traffic using the available paths.

As shown, the LEO satellite 120 may determine the available network paths to reach the destination ground station 110, and send probes 302A, 302B, to 302N along the different network paths to the destination ground station 110. The probes 302 can be any type of probe protocol or packet, such as Internet Control Message Protocol (ICMP) Echo Request packets, User Datagram Protocol (UDP) packets, Transport Control Protocol (TCP) packets, HTTP probes, etc. The LEO satellite 120 may use the probes 302 in order to determine the latencies. The LEO satellite 120 may then store the latencies 304 locally, and periodically update the latencies 304, such that the LEO satellite 120 is able to determine optimal paths for different data types.

Figure 4:
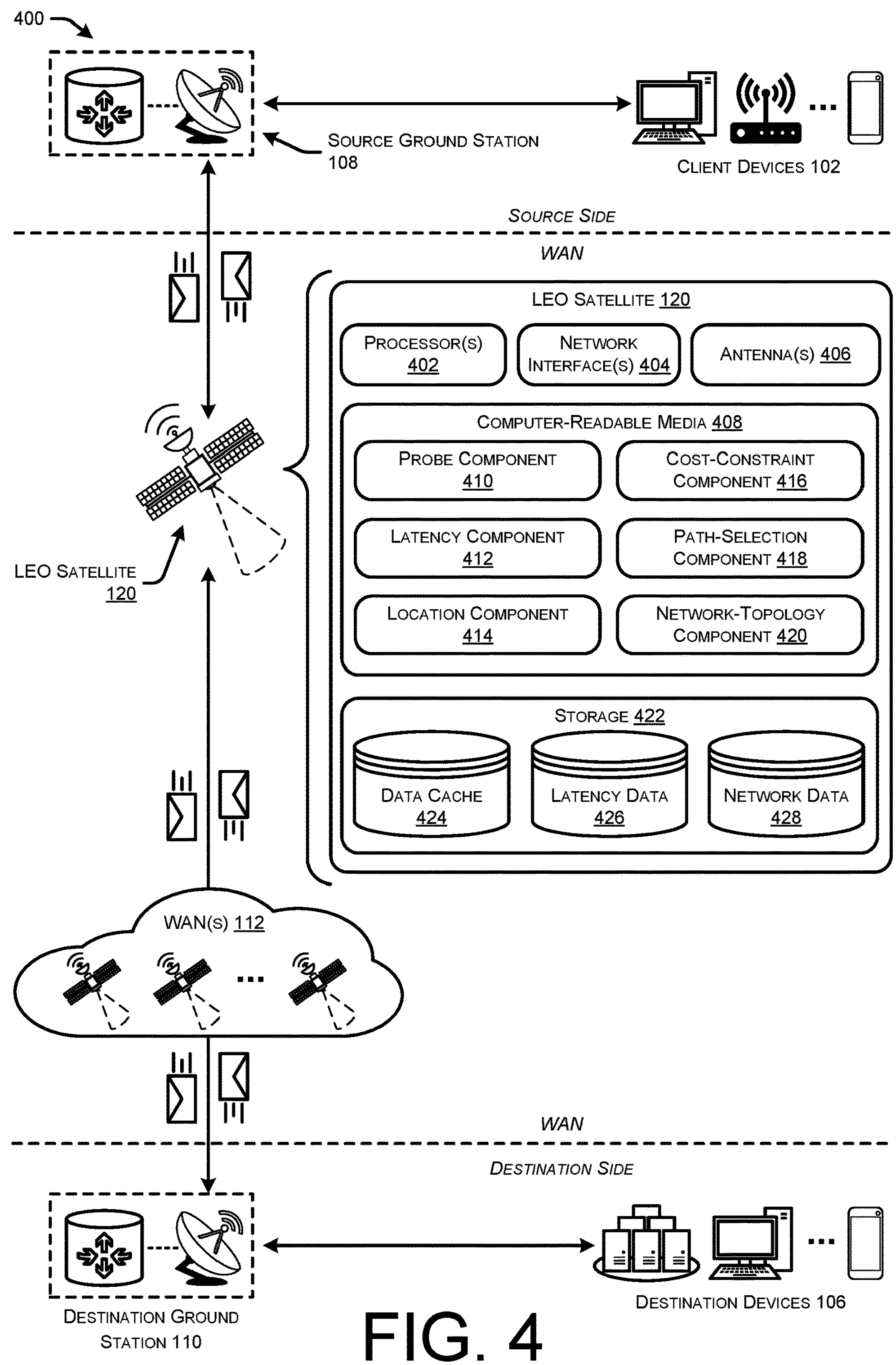
FIG. 4 illustrates a component diagram of an example LEO satellite that routes data through optimal satellite paths using quality of service (QoS) thresholds, such as latency thresholds, associated with the data.

FIG. 4 illustrates a component diagram 400 of an example LEO satellite 120 that routes data through optimal satellite paths using quality of service (QoS) thresholds, such as latency thresholds, associated with the data.

As illustrated, the LEO satellite 120 may include one or more hardware processors 402 (processors), one or more devices, configured to execute one or more stored instructions. The processor(s) 402 may comprise one or more cores. Further, the LEO satellite 120 may include one or more network interfaces 404 configured to provide communications between the LEO satellite 120 and other devices, such as the source ground stations 108, the destination ground stations 110, GEO satellites 124, MEO satellites 122, and/or other devices and systems or devices. The network interfaces 404 may include devices configured to couple to personal area networks (PANs), wired and wireless local area networks (LANs), satellite networks, wired and wireless wide area networks (WANs), and so forth, the LEO satellite 120 may further include one or more antennas 406 used to transmit data to any type of device or satellite.

The LEO satellite 120 may also include computer-readable media 408 that stores various executable components (e.g., software-based components, firmware-based components, etc.). The computer-readable-media 408 may further store or be used to execute components to implement functionality described herein. While not illustrated, the computer-readable media 408 may store one or more operating systems utilized to control the operation of the one or more devices that comprise the LEO satellite 120. According to one embodiment, the operating system comprises the LINUX operating system. According to another embodiment, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the LEO satellite 120 may include storage 422 which may comprise one, or multiple, repositories or other storage locations for persistently storing and managing collections of data such as databases, simple files, binary, and/or any other data. The storage 422 may include one or more storage locations that may be managed by one or more database management systems.

The computer-readable media 408 may store portions, or components, of the LEO satellite 120 described herein. For instance, the computer-readable media 408 may store probe component that generates and sends probe according to a timeline to determine latencies for available network paths. The CRM 408 may store and help execute a latency component 412 that uses the probe data to determine latencies for the available network paths, and re-calculate the latencies as the LEO satellite 120 moves. The CRM 408 may include a location component 414 that is configured to determine and monitor the location of the LEO satellite 120, as well as locations of ground stations and other satellites with which the LEO satellite 120 may communicate. The location component 414 may receive, or proactively obtain, geolocation information from the different devices, and determine its own location using various sensors or by receiving data from other devices.

The CRM 408 may store or include a cost-constraint component 416 that is configured to determine and maintain cost-constraint variables that represent various costs for transmitting data along the different paths. As an example, transmitting data through MEO/GEO satellite networks can be more expensive than using LEO satellite networks, and that cost may be passed onto the user or the LEO satellite network operator. Accordingly, network paths through MEO/GEO satellite networks may have associated cost-constraints variables attached that may cause the cost-constraint component 416 to favor other network path options. As another example, the cost-constraint component 416 may consider transmission costs through the different network paths. For instance, next hops that are further away may require more power to transmit data to, and that may strain the batteries on the LEO satellites. Accordingly, the cost-constraint component 416 may weight those options down based on the cost of transmission on battery life.

The CRM 408 may further store and execute a path-selection component 418 that selects network paths for data transmissions based at least in part on the latencies of the network paths and the latency thresholds 134 for the data 126. The CRM 408 may further store and execute a network-topology component 420 that monitors and maintains the topology of the different satellite layers based on, for instance, the time of day. The network-topology component 420 may determine what network paths are available to the LEO satellite 120 at different times of day and/or at different locations in outer space.

Additionally, the LEO satellite 120 may additionally include storage 422 which may comprise one, or multiple, repositories or other storage locations for persistently storing and managing collections of data such as databases, simple files, binary, and/or any other data. The storage 422 may include one or more storage locations that may be managed by one or more database management systems. The storage 422 may include or store a data cache 424 that is used to cache data that is to be transmitted by the LEO satellite 120, such as in examples where the LEO satellite 120 caches the data for a period of time until a destination ground station 110 comes within range. Further, the storage 422 includes latency data 426, such as latencies 304 for network paths and latency thresholds 134 for data. Additionally, the storage 422 may store various network data described herein, such as topologies of networks, locations of satellites and ground stations relative to the LEO satellite 120.

FIG. 5 illustrates a flow diagram of an example method 500 that illustrates aspects of the functions performed at least partly by the devices in the distributed application architecture as described in FIGS. 1-4. The logical operations described herein with respect to FIG. 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules.

These operations, structural devices, acts, and modules can be implemented in software, in firmware, in special purpose digital logic, and any combination thereof. It should also be appreciated that more or fewer operations might be performed than shown in FIG. 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, and/or different components.

FIG. 5 illustrates a flow diagram of an example method 500 for a LEO satellite 120 to route data through optimal satellite paths based on quality of service (QoS) thresholds, such as latency thresholds, associated with the data. In some examples, the steps of method 500 may be performed, at least partly, by a LEO satellite 120 as described herein. The LEO satellite 120 may utilize a satellite dish antenna and may include one or more processors and one or more non-transitory computer-readable media storing computer-executable instructions that, when executed by the one or more processors, cause the one or more processors to perform the operations of method 500.

At 502, the LEO satellite 120 may receive a data packet 126 sent from a source ground device. At 504, the LEO satellite 120 may identify, from the data packet, a latency threshold 134 associated with a data type of the data packet, and/or an application 104 that sent the data packet 126. In some instances, the latency threshold 134 may be indicative of an amount of time by which the data packet is to be sent to a destination ground device.

At 506, the LEO satellite 120 may identify a first satellite path and a second satellite path that are each usable to transmit the data packet from the LEO satellite and to the destination ground device. For instance, the LEO satellite 120 may determine its own location, and then determine the position of other satellites and ground stations relative to its own location. Those locations of the other satellites and ground stations are then used to determine available network paths over which the data packet 126 may be routed.

At 508, the LEO satellite 120 may determine a first latency associated with transmitting the data packet to the destination ground device using the first satellite path, and at 510, the LEO satellite 120 may determine a second latency associated with transmitting the data packet to the destination ground device using the second satellite path. For instance, the LEO satellite may use probes to determine the latencies of the different satellite paths.

At 512, the LEO satellite 120 may determine, based at least in part on the latency threshold, the first latency, and the second latency, that the first satellite path is more optimal for transmitting the data packet than the second satellite path. At 514, the LEO satellite 120 may transmit the data packet to the destination ground device using the first satellite path.

Figure 6:
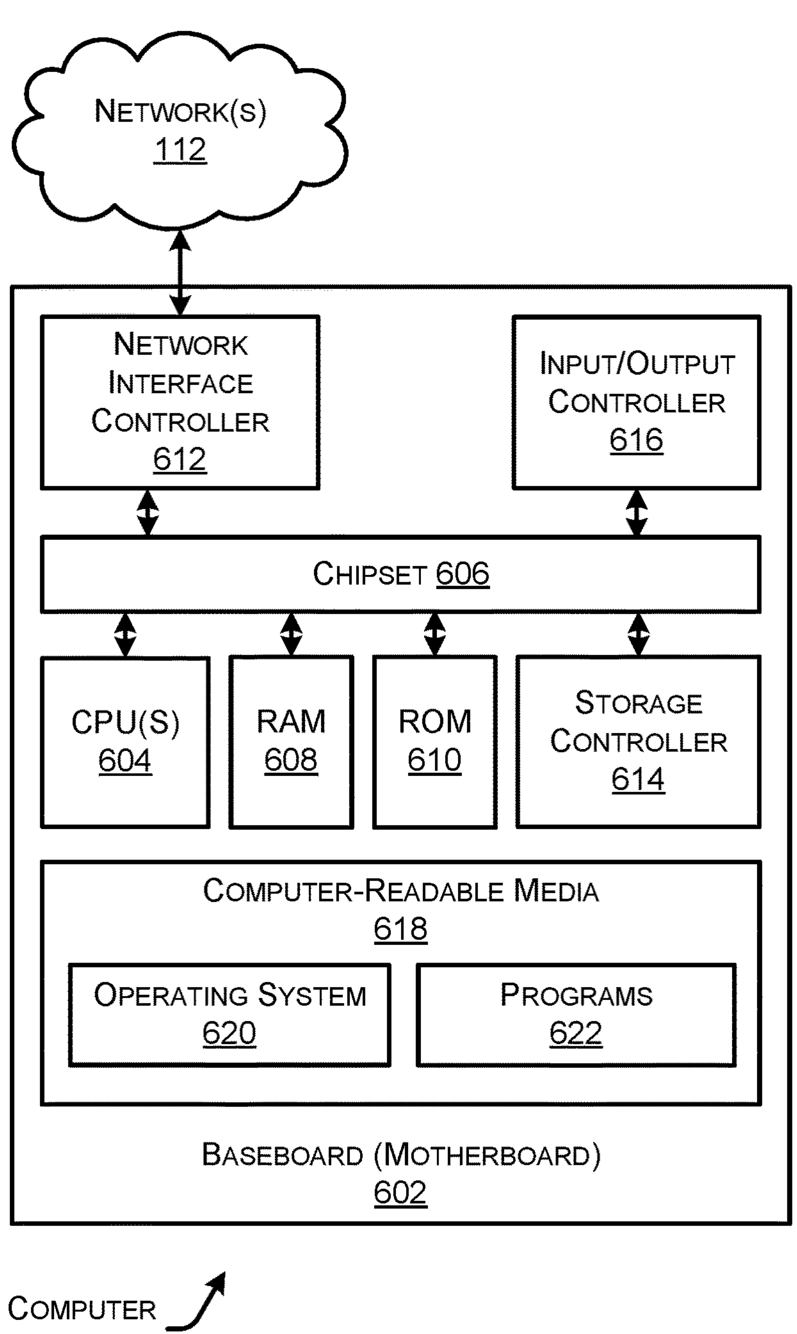
FIG. 6 is a computer architecture diagram showing an illustrative computer hardware architecture for implementing a computing device that can be utilized to implement aspects of the various technologies presented herein.

FIG. 6 is a computer architecture diagram showing an illustrative computer hardware architecture for implementing a computing device that can be utilized to implement aspects of the various technologies presented herein. The computer architecture shown in FIG. 6 illustrates sample device that can be configured to perform any of the techniques described herein, such as a client device 102, a source ground station 108, a LEO satellite 120, and/or any other device presented herein. The computer 600 may, in some examples, correspond to or include networked devices such as servers, switches, routers, hubs, bridges, gateways, modems, repeaters, access points, etc.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 112. The chipset 606 can include functionality for providing network connectivity through a NIC 612, such as a gigabit Ethernet adapter. The NIC 612 is capable of connecting the computer 600 to other computing devices over the network 112. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by devices and/or any components included therein, may be supported by one or more devices similar to computer 600. Stated otherwise, some or all of the operations performed by the components included therein, may be performed by one or more computer devices 600 operating in any arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at least partly by a low Earth orbit (LEO) satellite that routes data through optimal satellite paths, the method comprising:

receiving, at the LEO satellite, a data packet sent from a source ground device;

identifying, from the data packet, a latency threshold associated with an application that generated the data packet, the latency threshold being indicative of an amount of time by which the data packet is to be sent to a destination ground device;

identifying a first satellite path and a second satellite path that are each usable to transmit the data packet from the LEO satellite and to the destination ground device;

determining a first latency associated with transmitting the data packet to the destination ground device using the first satellite path;

determining a second latency associated with transmitting the data packet to the destination ground device using the second satellite path;

determining, using the first latency and the second latency, that the first satellite path and the second satellite path both satisfy the latency threshold;

determining, based at least in part on the latency threshold, the first latency, and the second latency, that a first difference between the first latency and the amount of time is less than a second difference between the second latency and the amount of time, wherein the first latency is greater than the second latency; and transmitting the data packet to the destination ground device using the first satellite path.

2. The method of claim 1, further comprising:

determining, based at least in part on the latency threshold, that the data packet comprises latency insensitive data;

determining that the first latency is greater than the second latency, wherein determining that the first satellite path is more optimal for transmitting the data packet than the second satellite path is based at least in part on the first latency being greater than the second latency and the data packet comprising latency insensitive data.

3. The method of claim 1, further comprising:

determining, based at least in part on the latency threshold, that the data packet comprises latency sensitive data;

determining that the first latency is less than the second latency, wherein determining that the first satellite path is more optimal for transmitting the data packet than the second satellite path is based at least in part on the first latency being less than the second latency and the data packet comprising latency sensitive data.

4. The method of claim 1, further comprising:

determining a period of time until the destination ground device is within transmission range of the LEO satellite;

determining that the period of time satisfies the latency threshold; and caching the data packet at the LEO satellite for the period of time, wherein the LEO satellite transmits the data packet directly to the destination ground device subsequent to the period of time and while the destination ground device is within the transmission range.

5. The method of claim 1, wherein:

the first satellite path comprises a first one of:

another LEO satellite in a LEO satellite layer;

a medium Earth orbit (MEO satellite) in a MEO satellite layer; or a geosynchronous Earth orbit (GEO) satellite in a GEO satellite layer;

the second satellite path comprises a second one of:

the other LEO satellite in a LEO satellite layer;

the MEO satellite in a MEO satellite layer; or a GEO satellite in a GEO satellite layer; and the first one is different than the second one.

6. The method of claim 1, further comprising:

determining that a threshold period of time has elapsed from a previous time at which the first and second latencies were determined for the first and second satellite paths;

sending a first probe through the first satellite path to reevaluate the first latency; and sending a second probe through the second satellite path to reevaluate the second latency.

7. The method of claim 1, further comprising:

determining a first cost variable for the first satellite path, the first cost variable indicating a first cost for the LEO satellite to transmit on the first satellite path;

determining a second cost variable for the second satellite path, the second cost variable indicating a second cost for the LEO satellite to transmit on the second satellite path; and selecting the first satellite path based at least on part on at least one of the first cost variable or the second cost variable.

8. A low Earth orbit (LEO) satellite that routes data through optimal satellite paths, the LEO satellite comprising:

one or more processors; and one or more non-transitory computer-readable media storing computer-executable instructions that, when executed by the one or more processors, cause the one or more processors to perform operations comprising:

receiving a data packet sent from a source ground device;

identifying, from the data packet, a latency threshold associated with a data type of the data packet, the latency threshold being indicative of an amount of time by which the data packet is to be sent to a destination ground device;

identifying a first satellite path and a second satellite path that are each usable to transmit the data packet from the LEO satellite and to the destination ground device;

determining a first latency associated with transmitting the data packet to the destination ground device using the first satellite path;

determining a second latency associated with transmitting the data packet to the destination ground device using the second satellite path;

determining, using the first latency and the second latency, that the first satellite path and the second satellite path both satisfy the latency threshold;

determining, based at least in part on the latency threshold, the first latency, and the second latency, that a first difference between the first latency and the amount of time is less than a second difference between the second latency and the amount of time, wherein the first latency is greater than the second latency; and transmitting the data packet to the destination ground device using the first satellite path.

9. The LEO satellite of claim 8, the operations further comprising:

determining, based at least in part on the latency threshold, that the data packet comprises latency insensitive data;

determining that the first latency is greater than the second latency, wherein determining that the first satellite path is more optimal for transmitting the data packet than the second satellite path is based at least in part on the first latency being greater than the second latency and the data packet comprising latency insensitive data.

10. The LEO satellite of claim 8, the operations further comprising:

determining a first location of the LEO satellite with respect to at least one of the source ground device or a second location on Earth, wherein the first and second satellite paths are determined based at least in part on the first location of the LEO satellite.

11. The LEO satellite of claim 8, the operations further comprising:

determining a period of time until the destination ground device is within transmission range of the LEO satellite;

determining that the period of time satisfies the latency threshold; and caching the data packet at the LEO satellite for the period of time, wherein the LEO satellite transmits the data packet directly to the destination ground device subsequent to the period of time and while the destination ground device is within the transmission range.

12. The LEO satellite of claim 8, wherein:

the first satellite path comprises a first one of:

another LEO satellite in a LEO satellite layer;

a medium Earth orbit (MEO satellite) in a MEO satellite layer; or a geosynchronous Earth orbit (GEO) satellite in a GEO satellite layer;

the second satellite path comprises a second one of:

the other LEO satellite in a LEO satellite layer;

the MEO satellite in a MEO satellite layer; or a GEO satellite in a GEO satellite layer; and the first one is different than the second one.

13. The LEO satellite of claim 8, the operations further comprising:

determining that a threshold period of time has elapsed from a previous time at which the first and second latencies were determined for the first and second satellite paths;

sending a first probe through the first satellite path to reevaluate the first latency; and sending a second probe through the second satellite path to reevaluate the second latency.

14. The LEO satellite of claim 8, the operations further comprising:

determining a first cost variable for the first satellite path, the first cost variable indicating a first cost for the LEO satellite to transmit on the first satellite path;

determining a second cost variable for the second satellite path, the second cost variable indicating a second cost for the LEO satellite to transmit on the second satellite path; and selecting the first satellite path based at least on part on at least one of the first cost variable or the second cost variable.

15. A system comprising:

one or more processors; and one or more non-transitory computer-readable media storing computer-executable instructions that, when executed by the one or more processors, cause the one or more processors to perform operations comprising:

receiving, at a low Earth orbit (LEO) satellite, a data packet sent from a source ground device;

identifying, from the data packet, a latency threshold associated with the data packet, the latency threshold being indicative of an amount of time by which the data packet is to be sent to a destination ground device;

identifying a first satellite path and a second satellite path that are each usable to transmit the data packet from the LEO satellite and to the destination ground device;

determining a first latency associated with transmitting the data packet to the destination ground device using the first satellite path;

determining a second latency associated with transmitting the data packet to the destination ground device using the second satellite path;

determining, based at least in part on the latency threshold and the first latency, that the first satellite path is more optimal for transmitting the data packet than the second satellite path;

determining a period of time until the destination ground device is within transmission range of the LEO satellite;

determining that the period of time satisfies the latency threshold; and caching the data packet at the LEO satellite for the period of time, transmitting the data packet to the destination ground device using the first satellite path, wherein the LEO satellite transmits the data packet directly to the destination ground device subsequent to the period of time and while the destination ground device is within the transmission range.

16. The system of claim 15, the operations further comprising:

determining, based at least in part on the latency threshold, that the data packet comprises latency insensitive data;

determining that the first latency is greater than the second latency, wherein determining that the first satellite path is more optimal for transmitting the data packet than the second satellite path is based at least in part on the first latency being greater than the second latency and the data packet comprising latency insensitive data.

17. The system of claim 15, wherein:

the first satellite path comprises a first one of:

another LEO satellite in a LEO satellite layer;

a medium Earth orbit (MEO satellite) in a MEO satellite layer; or a geosynchronous Earth orbit (GEO) satellite in a GEO satellite layer;

the second satellite path comprises a second one of:

the other LEO satellite in a LEO satellite layer;

the MEO satellite in a MEO satellite layer; or a GEO satellite in a GEO satellite layer; and the first one is different than the second one.

18. The system of claim 15, the operations further comprising:

determining that a threshold period of time has elapsed from a previous time at which the first and second latencies were determined for the first and second satellite paths;

sending a first probe through the first satellite path to reevaluate the first latency; and sending a second probe through the second satellite path to reevaluate the second latency.

19. The system of claim 15, the operations further comprising:

determining a first cost variable for the first satellite path, the first cost variable indicating a first cost for the LEO satellite to transmit on the first satellite path;

determining a second cost variable for the second satellite path, the second cost variable indicating a second cost for the LEO satellite to transmit on the second satellite path; and selecting the first satellite path based at least on part on at least one of the first cost variable or the second cost variable.

* * * * *